(12) United States Patent
Hanes

(10) Patent No.: US 8,880,471 B2
(45) Date of Patent: Nov. 4, 2014

(54) VIRTUAL STORAGE DEVICE

(75) Inventor: David H Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 44 days.

(21) Appl. No.: 12/815,641

(22) Filed: Jun. 15, 2010

(65) Prior Publication Data

US 2011/0307525 A1     Dec. 15, 2011

(51) Int. Cl.
*G06F 7/00* (2006.01)
*G06F 17/30* (2006.01)

(52) U.S. Cl.
CPC ................... *G06F 17/30235* (2013.01)
USPC .......................................... 707/644

(58) Field of Classification Search
CPC ............ G06F 11/1458; G06F 11/1464; G06F 11/1469; G06F 11/1451; G06F 11/1453; G06F 17/30; G06F 2201/84

USPC .......................................... 707/644
See application file for complete search history.

(56) References Cited

U.S. PATENT DOCUMENTS

| | | | |
|---|---|---|---|
| 7,073,010 B2 | 7/2006 | Chen et al. | |
| 7,966,288 B2 * | 6/2011 | Hahn et al. ................ | 707/636 |
| 2002/0103819 A1 * | 8/2002 | Duvillier et al. ............ | 707/206 |
| 2004/0054866 A1 * | 3/2004 | Blumenau et al. ........... | 711/202 |
| 2007/0094300 A1 * | 4/2007 | Abnous et al. ........... | 707/103 R |
| 2007/0255920 A1 * | 11/2007 | Gold ........................... | 711/170 |
| 2008/0134178 A1 * | 6/2008 | Fitzgerald et al. .............. | 718/1 |
| 2009/0113076 A1 * | 4/2009 | Long ............................ | 709/248 |
| 2009/0228669 A1 * | 9/2009 | Slesarev et al. ............... | 711/161 |

* cited by examiner

*Primary Examiner* — Truong Vo
(74) *Attorney, Agent, or Firm* — Chun-Liang Kuo

(57) ABSTRACT

A method for managing a virtual storage device including scanning ports of a device for storage devices coupled to the device and identifying file systems of the storage devices, creating a database to include entries for the storage devices and files included in the storage devices based on the file systems of the storage devices, and aggregating the files listed in the database as a virtual storage device.

25 Claims, 7 Drawing Sheets

VIRTUAL STORAGE DEVICE

BACKGROUND

When accessing one or more storage devices, the user can physically access and connect one or more of the storage devices to available ports on a computing machine. The user can then access an input device of the computing machine and proceed to configure the storage devices for use. In response to the storage devices being configured, the computing machine can proceed to present each of the storage devices for use.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By scanning ports of a device for storage devices coupled to the device, one or more file systems and information of the coupled storage devices can accurately be identified. Additionally, by creating a database of entries which list the file systems and information of the coupled storage devices, a virtual storage device can conveniently and efficiently be created. Further, by organizing the entries of the database based on the file systems of the storage devices; files, metadata, and/or free space of the same or similar file system can be aggregated in the virtual storage device. As a result, when accessing the files, metadata, and/or free space of the virtual storage device, a seek time, access time, and/or write time to the files and/or free space which utilize the same or similar file system can be reduced.

Figure 1:
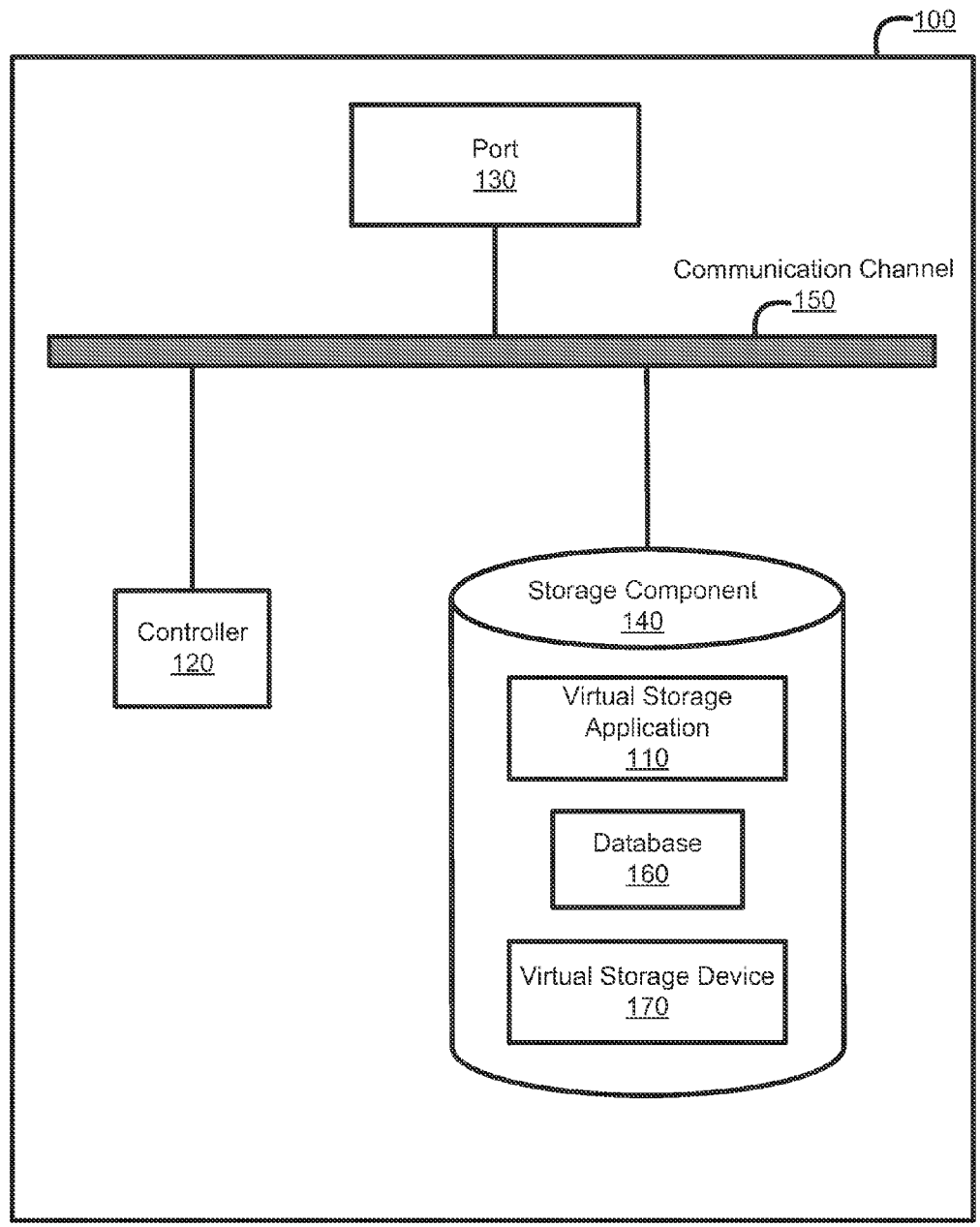
FIG. 1 illustrates a device with one or more ports according to an embodiment of the invention.

FIG. 1 illustrates a device 100 with one or more ports 130 according to an embodiment of the invention. In one embodiment, the device 100 is a direct attached storage device. In another embodiment, the device 100 is a network attached storage device. In other embodiments, the device 100 is a desktop, a laptop, a netbook, a server, and/or any computing device which can include one or more ports 130.

As illustrated in FIG. 1, the device 100 includes a controller 120, a storage component 140, one or more ports 130, and a communication channel 150 for the device 100 and/or one or more components of the device 100 to communicate with one another. Additionally, as shown in FIG. 1, the storage component 140 includes a virtual storage application 110, a database 160, and a virtual storage device 170. In other embodiments, the device 100 includes additional components and/or is coupled to additional components in addition to and/or in lieu of those noted above and illustrated in FIG. 1.

As noted above, the device 100 includes a controller 120. The controller 120 sends data and/or instructions to the components of the device 100, such as one or more of the ports 130 and the virtual storage application 110. Additionally, the controller 120 receives data and/or instruction from components of the device 100, such as one or more of the ports 130 and the virtual storage application 110.

The virtual storage application 110 is an application which creates and/or manages a virtual storage device 170 if one or more storage devices are coupled to the device 100. For the purposes of this application, a virtual storage device 170 is a virtual device rendered as a storage device where files, data, and/or free space listed in the virtual storage device 170 are linked and/or mapped to files, data, and/or free space from one or more of the storage devices coupled to the device 100. When managing a virtual storage device 170, the virtual storage application 110 scans one or more ports of the device 100 for storage devices coupled the device 100.

If any storage devices are coupled to the device 100, the virtual storage application 110 will identify file system(s) for the coupled storage devices. For the purposes of this application, a file system of a storage device corresponds to how data and/or files on a storage device are managed and/or stored. The virtual storage application 110 then proceeds to create and/or edit a database 160 to include entries for the storage devices and files included in the storage devices based on the file systems of the storage devices. Utilizing information of the storage devices from the database, the virtual storage application 110 will aggregate the files listed in the database as a virtual storage device 170.

The virtual storage application 110 can be firmware which is embedded onto the device 100 and/or the storage component 140. In another embodiment, the virtual storage application 110 is a software application stored on the device 100 within ROM or on the storage component 140 accessible by the device 100. In other embodiments, the virtual storage application 110 is stored on a computer readable medium readable and accessible by the device 100 or the storage component 140 from a different location.

Additionally, in one embodiment, the storage component 140 is included in the device 100. In other embodiments, the storage component 140 is not included in the device 100, but is accessible to the device 100 utilizing a network interface included in the device 100. The network interface can be a wired or wireless network interface card. In other embodiments, the storage component 140 can be configured to couple to one or more ports or interfaces on the device 100 wirelessly or through a wired connection.

In a further embodiment, the virtual storage application 110 is stored and/or accessed through a server coupled through a local area network or a wide area network. The virtual storage application 110 communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

As noted above, the virtual storage application 110 scans one or more ports 130 of a device 100 for storage devices coupled to the device 100. A controller 120 of the device 100 initially sends one or more instructions for the virtual storage application 110 to determine whether any storage devices are coupled to the device 100. When determining whether any storage devices are coupled to the device, the virtual storage application 110 scans one or more ports 130 of the device for storage devices coupling or coupled to the device 100.

A port 130 is a component of the device 100 configured to engage one or more interfaces of a storage device when coupling a storage device to the device 100. One or more ports 130 can be coupled or mounted to one or more locations on the device 100. One or more of the ports 130 can be a USB port, a serial device port, a compact flash port, an XD card port, a SD card port, a SATA port, an ESATA port, a PCI port, a PCIE port, and/or an IDE port. In other embodiments, a port 130 can include additional types of components of the device 100 configured to couple one or more storage devices to the device 100.

A storage device is a device or component configured to store data and interface with one or more ports 130 of the device 100 when coupling to the device 100. The storage device can include a solid state device, a disk storage device, a tape storage device, and/or any additional device configured to store data. The data stored on a storage device can include files and metadata of the files or of the storage device. Additionally, the data can be stored and/or organized on the storage devices using one or more file systems.

In response to the virtual storage application 110 detecting one or more storage devices coupled to the device 100, the controller 120 sends an instruction for the virtual storage application 110 to interface with the coupled storage devices and identify file systems of the storage devices. The storage devices coupled to the device 100 can utilize one or more file system types. One or more of the types of files systems can include a FAT, exFAT, NTFS, ETFS, ISO, DOS, ext, and/or a MFS file system. In other embodiments, additional file system types can be utilized by one or more of the coupled storage devices in addition to and/or in lieu of those noted above. Additionally, a file system used in a first coupled storage device can be different from a file system used in a second coupled storage device.

When identifying what type of file system a coupled storage device utilizes, the virtual storage application 110 can scan one or more files included in the storage device for a listed file system. One or more of the files can be a header file or a master boot record. In another embodiment, the virtual storage application 110 can identify a method of encryption, management, and/or organization used on the coupled storage device. Utilizing the method of encryption, management, and/or organization, the virtual storage application 110 can identify a corresponding file system which utilizes the identified method of encryption, management, and/or organization.

Based on the identified file systems of the coupled storage devices, the virtual storage application 110 proceeds to create or edit a database 160 to include entries for the storage devices, the files included in the storage devices, and metadata of the files and/or the storage devices. The database 160 includes one or more entries for the coupled storage devices and includes information from the coupled storage devices. In one embodiment, the entries additionally list a capacity of the storage devices and/or an amount of free space available on the storage devices.

As illustrated in FIG. 1, in one embodiment, the database 160 is stored on the storage component 140 of the device 100. In another embodiment, the database 160 can be stored at additional locations accessible to the virtual storage application 110 in addition to and/or in lieu of those noted above and illustrated in FIG. 1. In other embodiments, one or more files or lists is utilized instead of the database 160 to include or manage information of the storage devices.

Once the database 160, file, or list is created, the virtual storage application 110 will scan the coupled storage devices to identify files and metadata stored on the corresponding storage devices. In one embodiment, the virtual storage application 110 additionally identifies an amount of free space on the coupled storage devices. The metadata of the corresponding storage devices can specify a location or address of the files and/or free space included in the corresponding storage devices.

Utilizing the collected and/or identified information from the coupled storage devices, the virtual storage application 110 will proceed to populate the entries in the database 160 with corresponding file systems, the files, the metadata, and/or an amount of free space from the corresponding storage devices. In one embodiment, the virtual storage application 110 will additionally list and link the listed files in the database 160 to their corresponding location on the corresponding storage devices.

Once the entries in the database 160 have been populated, the virtual storage device 110 will proceed to organize the entries in the database 160 based on the file systems of the storage devices. In one embodiment, the virtual storage application 110 organizes entries which include the same or a similar file system next to one another. The virtual storage application 110 then proceeds to aggregate the files, the metadata, and/or the free space listed in the database 160.

By organizing the entries of the database 160 based on the file systems of the storage devices, the files, the metadata, and/or the free space of the coupled storage devices can be aggregated in response to the file systems of the storage devices. As a result, a seek time, access time, and/or write time to the files and/or free space which utilize the same or similar file system can be reduced.

Utilizing the aggregated files, metadata, and/or free space, the virtual storage application 110 can create a virtual storage device 170 to include the files, metadata, and/or free space included in the coupled storage devices. The virtual storage application 110 renders the virtual storage device 170 as a storage device to any additional device or computing machine coupled to the device 100. Additionally, the virtual storage device 170 is rendered such that the aggregated files, aggregated metadata, aggregated capacity, and/or aggregated free space from the coupled storage devices appear to be included in the virtual storage device 170.

In one embodiment, utilizing the information included from the metadata, the virtual storage application 110 can additionally index the aggregated files and aggregated free space of the virtual storage device 170 to further improve seek, access, and/or write times to the files and free space of the virtual storage device 170.

Figure 2:
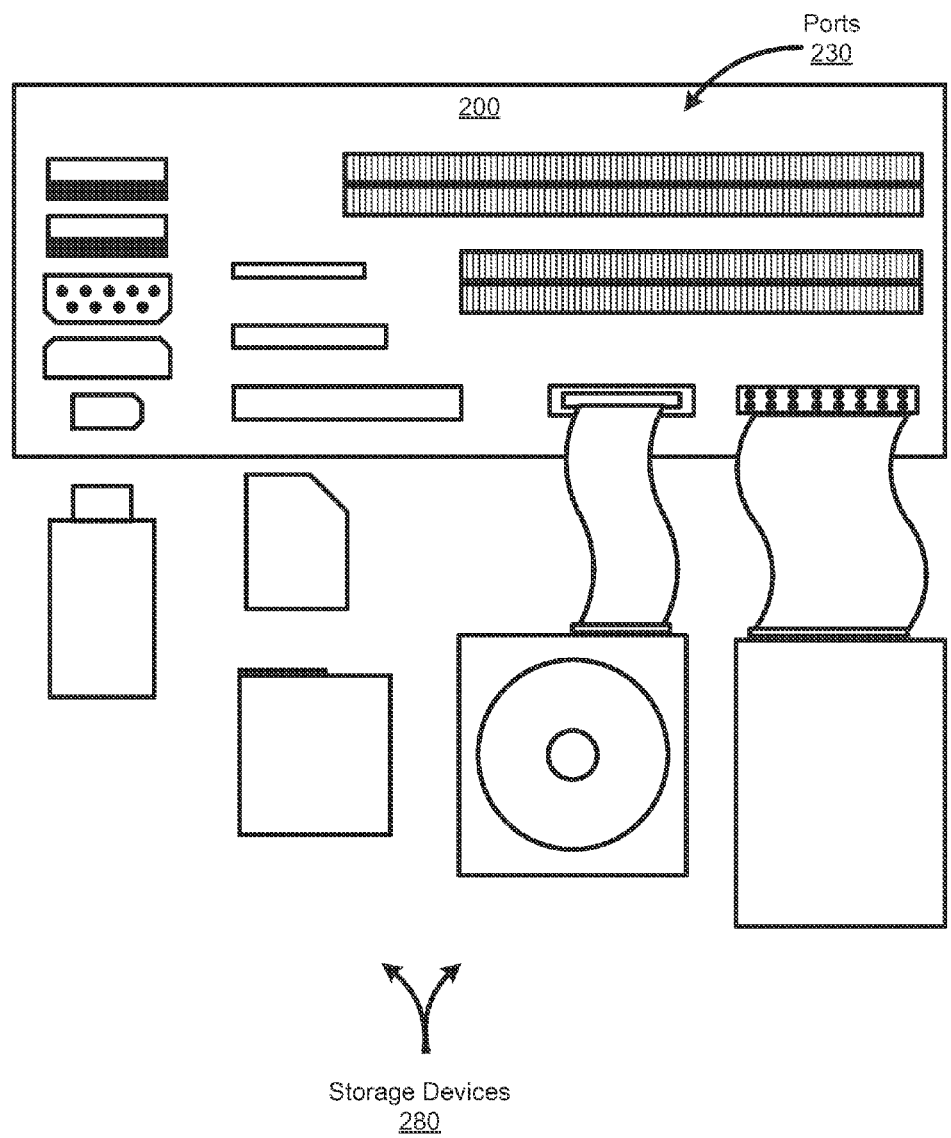
FIG. 2 illustrates storage devices coupled to ports of a device according to an embodiment of the invention.

FIG. 2 illustrates storage devices 280 coupled to ports 230 of a device 200 according to an embodiment of the invention. As noted above and as illustrated in the present embodiment, the device 200 includes one or more ports 230 which can engage and interface the device 200 with the storage devices 280. Further, one or more of the ports 230 can be or include a USB port, an serial port, an HDMI port, a firewire port, a SATA port, an ESATA port, a PCI port, a PCIE port, an IDE port, an XD card port, a SD card port, a micro SD port, and/or a compact flash port. In other embodiments, one or more of the ports 230 can include additional components configured to engage one or more storage devices 280 when interfacing the storage devices 280 with the device 200.

As illustrated in FIG. 2, the device 200 can engage and interface with the storage devices 280 through one or more cables and/or wires which physically couple the storage devices 280 to one or more of the ports 230. Additionally, one or more of the storage devices 280 can be inserted into one or more of the ports 230 when interfacing the device 200 with a storage device 280. In another embodiment, one or more of the ports 230 and one or more of the storage devices 280 can include wireless devices or components configured to wirelessly couple and interface with one another when coupling and/or interfacing the storage devices 280 with the device 200. In other embodiments, the device 200 can be configured to couple and interface with one or more of the storage devices 280 through a network interface of the device 200.

As noted above, one or more of the storage devices 280 include devices and/or components configured to store data and/or free space. The data can include files and metadata included on the storage devices 280. Further, one or more of the storage devices 280 can be or include a disk storage device, a tape storage device, a solid state drive, and/or any additional device configured to store data. In one embodiment, as illustrated in FIG. 2, one or more of the storage devices 280 include a USB device, a SD card, an XD card, a Compact Flash card, a Compact Disc device, and/or a hard drive. In other embodiments, one or more of the storage devices 280 can be or include additional components configured to include data and/or free space in addition to and/or in lieu of those noted above and illustrated in FIG. 2.

As noted above, a virtual storage application of the device 200 can identify one or more file systems of the storage devices 280 if the storage devices 280 couple to the device 200. The virtual storage application can determine whether any storage devices 280 are coupled to the device 200 by scanning one or more of the ports 230 for a storage device 280 or a signal from a storage device 280. In one embodiment, when coupled to one or more of the ports 230, a storage device 280 can generate a signal through one or more of the ports 230 indicating that the storage device 280 has coupled to the device 200.

In response to detecting a signal from the storage device 280 the virtual storage application will determine that the storage device 280 has coupled and interfaced with the device 200. Additionally, the virtual storage application can continue to scan one or more of the ports 230 for another storage devices 280 coupling to the device 200 or a storage device 280 decoupling from the device 200 by scanning the ports 230 for a new signal or a dropped signal. In response to one or more storage devices 280 coupling and/or decoupling from the device 200, a database and a virtual storage device can be created, updated, and/or repopulated.

Figure 3:
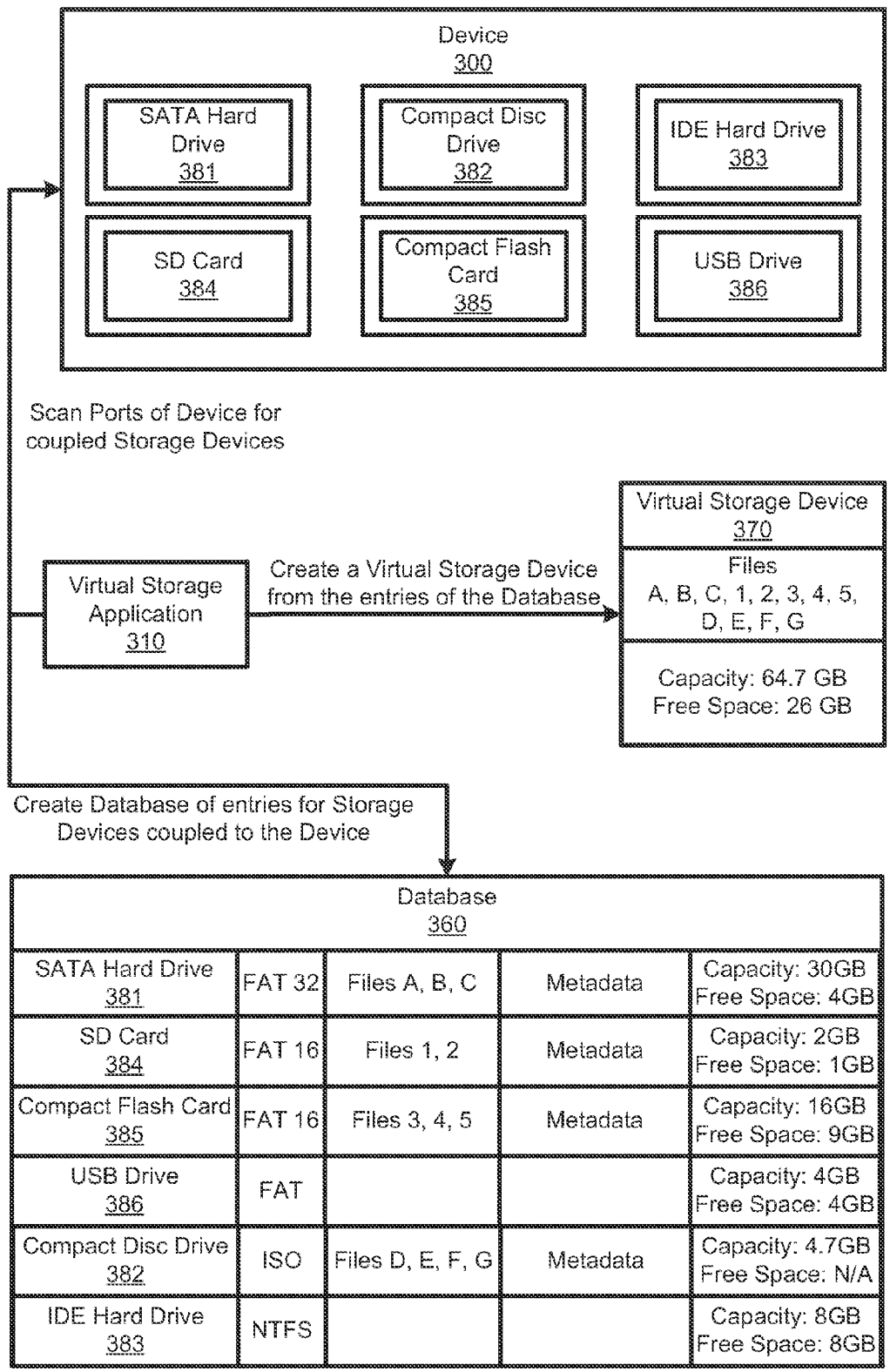
FIG. 3 illustrates a block diagram of a virtual storage application managing a virtual storage device according to an embodiment of the invention.

FIG. 3 illustrates a block diagram of a virtual storage application 310 managing a virtual storage device 370 according to an embodiment of the invention. As noted above, a controller of the device 300 initially sends one or more instructions to the virtual storage application 310 for the virtual storage application 310 to access one or more ports of the device 300 and scan the ports for coupled storage devices.

As illustrated in the present embodiment, the virtual storage application 310 has detected that a SATA Hard Drive 381, a Compact Disc Drive 382, an IDE Hard Drive 383, a SD Card 384, a Compact Flash Card 385, and a USB Drive 386 are interfaced with ports of the device 300 and are thus coupled to the device 300. As noted above, in response to detecting one or more coupled storage devices, the virtual storage application 310 proceeds to identify one or more file systems used in the storage devices and creates a database 360 to include entries for the storage devices.

As shown in FIG. 3, the virtual storage application 310 has created the database 360 to include entries for each of the storage devices, 381, 382, 383, 384, 385, 386. Additionally, within the entries for each of the storage devices, the virtual storage application 310 includes information corresponding to the storage devices. As noted above, the information can identify one or more file systems utilized by the storage devices, one or more files stored on the storage devices, metadata of the files and/or of the storage devices, an amount of free space on the storage devices, and/or a capacity of the storage devices.

As illustrated in FIG. 3, the virtual storage application 310 has populated the database 360 to include a first entry for SATA Hard Drive 381. Additionally, the virtual storage application 310 includes in the corresponding entry that SATA Hard Drive 381 utilizes a FAT 32 file system, includes Files A, B, and C, includes metadata, has a capacity of 30 GB, and 4 GB of free space. Further, the virtual storage application 310 creates an entry for SD Card 384 and includes in the corresponding entry that SD Card 384 uses a FAT 16 file system, includes Files 1 and 2, includes metadata, has a capacity of 2 GB, and has 1 GB of free space.

The virtual storage application 310 continues to create entries and populate the entries with information for Compact Flash Card 385, USB Drive 386, Compact Disc Drive 382, and IDE Hard Drive 383. The third entry of the database 360 lists that Compact Flash Card 385 utilizes a FAT 16 file system, stores Files 3, 4, and 5, includes Metadata, has a capacity of 16 GB, and includes 9 GB of free space. The fourth entry further lists that the USB Drive 386 utilizes a FAT file system, does not include any files or metadata, and has a capacity and free space of 4 GB. Additionally, the fifth entry lists that the Compact Disc Drive 382 utilizes an ISO file system, stores Files D, E, F, and G, includes metadata, and has a capacity of 4.7 GB. Further, the sixth entry lists that the IDE Hard Drive 383 utilizes a NTFS file system and has a capacity and free space of 8 GB.

As noted above, the entries in the database 360 are organized such that storage devices which utilize the same or a similar file system are listed together. As illustrated in FIG. 3, SATA Hard Drive 381, SD Card 384, Compact Flash Card 385, and USB Drive 386 utilize file systems which are the same or are similar to one another (FAT file system family). As a result, the database 360 is organized such that entries for SATA Hard Drive 381, SD Card 384, Compact Flash Card 385, and USB Drive 386 are listed next to one another.

In response to creating the database 360 and populating entries in the database 360, the virtual storage application 310 proceeds to aggregate the information included in the entries to create a virtual storage device 370. As illustrated in FIG. 3, the virtual storage device 370 includes the files, the metadata, capacity, and free space included in the storage devices. As a result, files A, B, C, D, E, F, G, 1, 2, 3, 4, and 5 are listed to be included in the virtual storage device 370, the virtual storage device 370 is listed to have a capacity of 64.7 GB, and the virtual storage device 370 includes 26 GB of free space.

Additionally, as noted above, in response to sorting the entries of the database 360 based on the file systems of the storage devices, the files and the free space of coupled storage devices can be aggregated in the virtual storage device 370 such that files utilizing the same or similar file system are grouped or organized together. As a result, as illustrated in FIG. 3, files A, B, C, 1, 2, 3, 4, and 5 are aggregated together in the virtual storage device 370 and files D, E, F, and G are aggregated together.

Once the virtual storage device 370 has been created, the virtual storage application 310 can render the virtual storage device 370 as a storage device to one or more additional devices or computing machines coupled to the device 300. An additional device or a computing machine can be coupled to the device through a physical connection or through a wireless connection. In one embodiment, the virtual storage application 310 additionally defines a file system for the virtual storage application 310. When rendered as a storage device, the virtual storage device 370 will appear and operate as a storage device which includes the files, metadata, capacity, and/or free space included in the storage devices, 381, 382, 383, 384, 385, 386 coupled to the device 300.

Once rendered, the virtual storage device 370 can be accessed in response to an additional device or computing machine reading, modifying, and/or writing to the virtual storage device 370. When accessed, the virtual storage application 310 will identify the read, modify, and/or write instruction from the additional device or computing machine and the corresponding file or free space being accessed.

The virtual storage application 310 will then access the metadata listed in the database 360 to identify a location of the corresponding file or free space to be accessed and map the instruction to the corresponding storage device where the file or free space is located. As noted above, the metadata included in the storage devices and listed in the database 360 can specify a location of the files and free space on the corresponding storage device.

In one embodiment, when mapping the instruction to the corresponding storage device, the virtual storage application 310 will identify the access instruction and proceed to utilize the metadata to identify which of the coupled storage devices, the file and/or free space is located. Once the file or free space is located, the virtual storage application 310 will proceed to execute the access instruction on the corresponding storage device. Additionally, in response to any accesses and/or changes made to the virtual storage device 370, the virtual storage application. 310 will update the database 360 and repopulate the virtual storage device 370 to include the changes.

Figure 4:
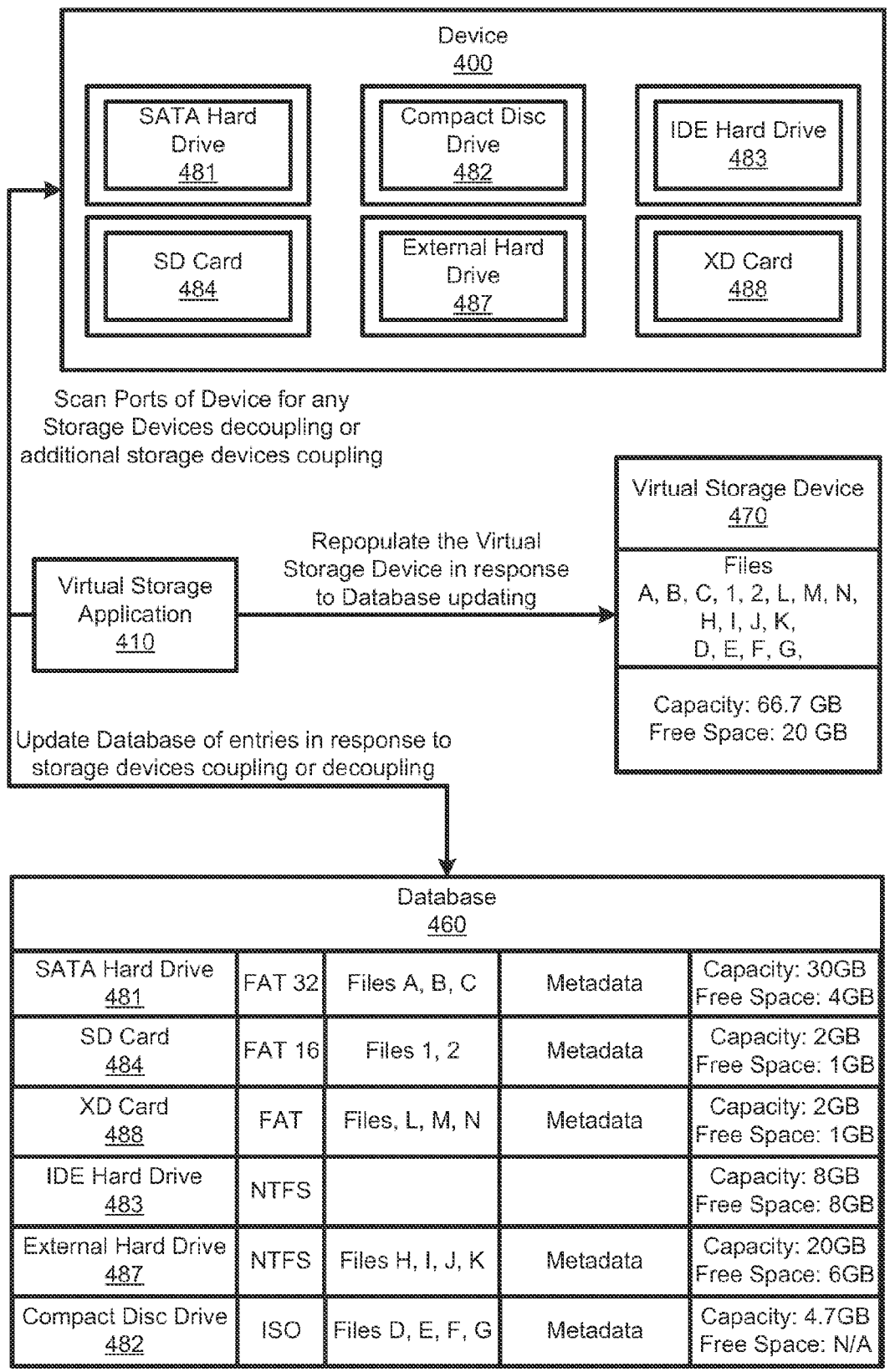
FIG. 4 illustrates a block diagram of a virtual storage application managing a virtual storage device according to another embodiment of the invention.

FIG. 4 illustrates a block diagram of a virtual storage application 410 managing a virtual storage device 470 according to another embodiment of the invention. As noted above, once the virtual storage device 470 has been created and rendered, the virtual storage application 410 can continue to scan one or more ports of the device 400 for one or more additional storage devices coupling to the device 400 or one or more storage devices decoupling from the device 400.

As illustrated in FIG. 4, the virtual storage application 410 has determined that the Compact Flash Card and the USB Drive have decoupled from the device 400. Additionally, the virtual storage application has detected External Hard Drive 487 and XD Card 488 coupling to the device 400. In response to the storage devices decoupling from the device 400 and the additional storage devices coupling to the device 400, the virtual storage application 410 proceeds to identify file systems utilized in the additional storage devices and update the database 460.

As shown in the present embodiment, the virtual storage application 410 has updated the database 460 to exclude entries and information in the entries corresponding to the Compact Flash Card and the USB Drive. Additionally, the virtual storage application 410 creates new entries for the XD Card 488 and the External Hard Drive 487. Further, the virtual storage application 410 populates the entries to reflect that XD Card 488 utilizes a FAT file system, stores Files L, M, N, includes Metadata, has a capacity of 2 GB, and has 1 GB of free space.

In addition, the entry for the External Hard Drive 487 lists an NTFS file system, Files H, I, J, K, Metadata, capacity of 20 GB, and 6 GB of free space. Further, because XD Card 488 utilizes a FAT file system, the corresponding entry is listed next to storage devices with the same or similar file systems, SATA Hard Drive 481 and SD Card 484. Additionally, the entry for External Hard Drive 487 is listed next to the entry for IDE Hard Drive 483 since both of the storage devices utilize a NTFS file system.

Once the database 460 has been updated, the virtual storage application 410 proceeds to update and/or repopulate the virtual storage device 470 to include the updates made to the database 460. In one embodiment, when updating and/or repopulating the virtual storage device 470, the virtual storage application 410 additionally re-aggregates the information in the database in response to the file systems of the coupled storage devices.

As illustrated in FIG. 4, the virtual storage device 470 is re-rendered such that the virtual storage device 470 includes files A, B, C, D, E, F, G, H, I, J, K, L, M, N, 1 and 2, has a capacity of 66.7 GB, and includes 20 GB of free space. Additionally, files A, B, C, 1, 2, L, M, and N are aggregated together since they utilize the same or similar file system. Further, files H, I, J, and K are re-aggregated together for using an NTFS file system and files D, E, F, and G are re-aggregated together for using an ISO file system.

Figure 5:
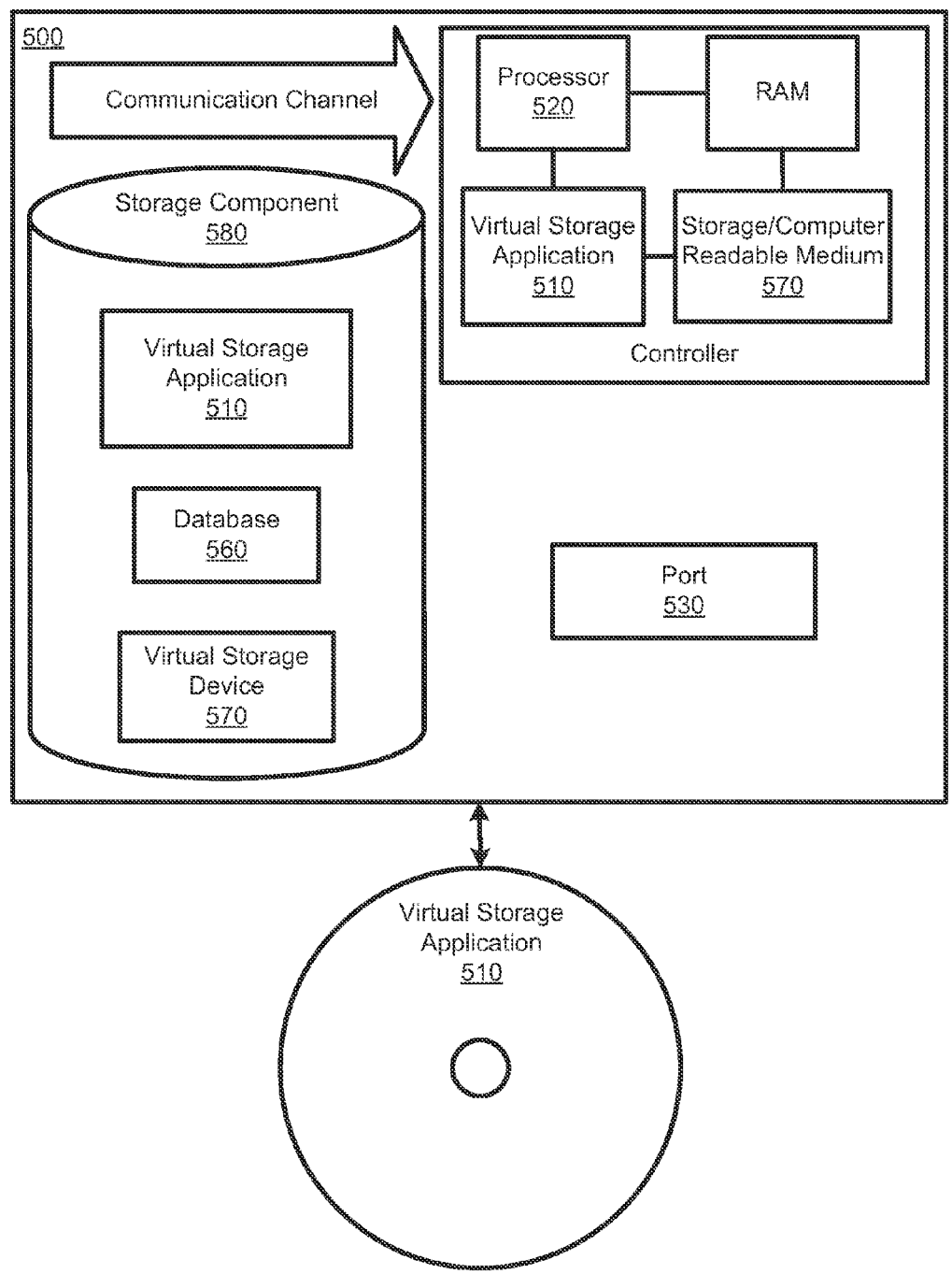
FIG. 5 illustrates a device with an embedded virtual storage application and a virtual storage application stored on a removable medium being accessed by the device according to an embodiment of the invention.

FIG. 5 illustrates a device with an embedded virtual storage application 510 and a virtual storage application 510 stored on a removable medium being accessed by the device 500 according to an embodiment of the invention. For the purposes of this description, a removable medium is any tangible apparatus that contains, stores, communicates, or transports the application for use by or in connection with the device 500. As noted above, in one embodiment, the virtual storage application 510 is firmware that is embedded into one or more components of the device 500 as ROM. In other embodiments, the virtual storage application 510 is a software application which is stored and accessed from a hard drive, a compact disc, a flash disk, a network drive or any other form of computer readable medium that is coupled to the device 500.

Figure 6:
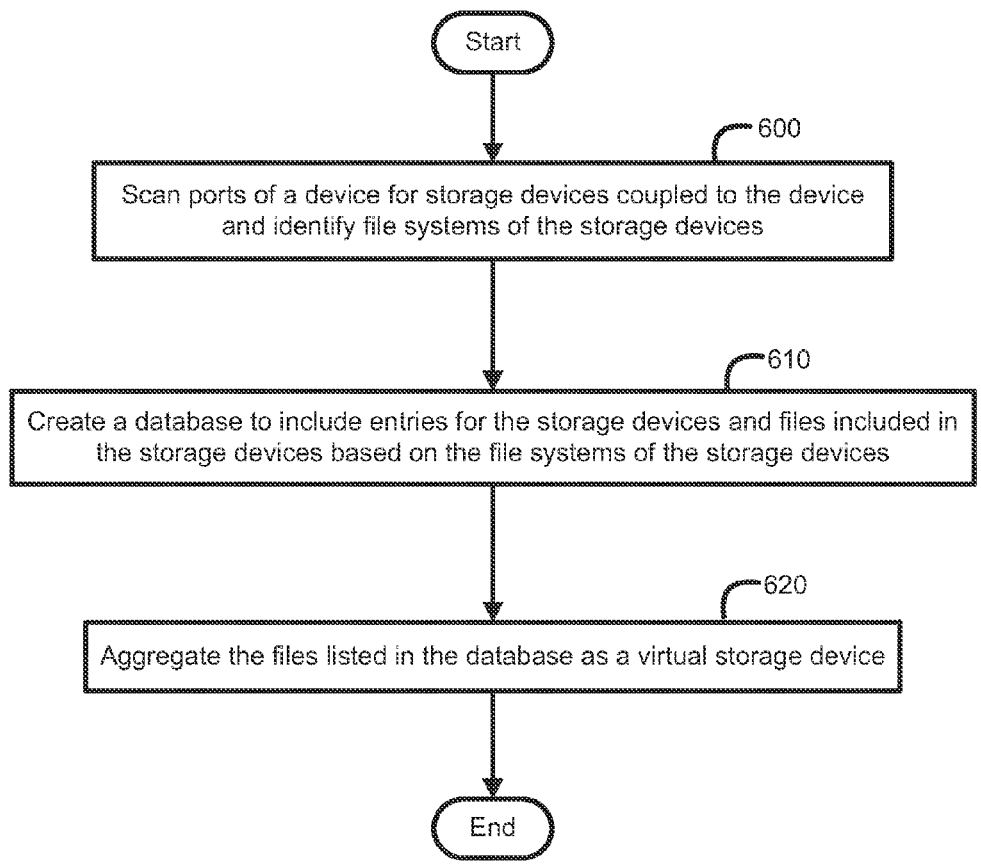
FIG. 6 is a flow chart illustrating a method for managing a virtual storage device according to an embodiment of the invention.

FIG. 6 is a flow chart illustrating a method for managing a virtual storage device according to an embodiment of the invention. The method of FIG. 6 uses a device with a controller, a communication channel, a storage component, one or more ports, and a virtual storage application. The device can be a direct attached storage device or a network attached storage device. In another embodiment, the device can be or include a computing machine. In other embodiments, the method of FIG. 6 uses additional components and/or devices in addition to and/or in lieu of those noted above and illustrated in FIGS. 1, 2, 3, 4, and 5.

As noted above, the virtual storage application is an application which creates and/or manages a virtual storage device. Additionally, a controller of the device initially sends one or more instructions for the virtual storage application to scan ports of the device for storage devices coupled to the device and identify file systems utilized in any of the coupled storage devices 600. As noted above, one or more ports are components of the device which can interface with one or more storage devices when coupling the storage devices to the device. In one embodiment, one or more ports can be physical components configured to physically interface and engage a storage device. In another embodiment, one or more of the ports can include wireless components configured to wireless interface with a storage device when coupling the storage device to the device.

Additionally, a storage device is a component configured to store data and/or include free space. Further, a file system of a corresponding storage device identifies and controls how data and/or free space on a storage device is encrypted, organized, and/or managed. As noted above, when identifying a file system utilized by a coupled storage device, the virtual storage application can read a header file and/or a master boot record of the coupled storage device. In another embodiment, the virtual storage application can identify a method of encryption, organization, and/or management utilized by the coupled storage device and identify a corresponding file system which utilizes the identified method of encryption, organization, and/or management.

In response to detecting coupled storage devices and identifying the file systems utilized by the coupled storage devices, the virtual storage application will proceed to create a database to include entries for the storage devices and files included in the storage devices based on the file systems of the storage devices 610. As noted above, the database includes entries for the couple storage devices and the entries include information corresponding to the coupled storage devices. In other embodiments, one or more files or lists are utilized to store information of the coupled storage devices.

The information can include a file system utilized by the corresponding storage device, files stored on the corresponding storage device, metadata included in the corresponding storage device, a capacity of the corresponding storage devices, and/or an amount of free space on the corresponding storage device. Additionally, the metadata can specify information of the files or of the corresponding storage device. In one embodiment, the metadata specifies a location or address of the files or free space included in a storage device.

Additionally, as noted above, the entries in the database are organized based on the file systems of the storage devices. As a result, entries for storage devices which use the same or similar file system are grouped together or listed next to one another. Utilizing the listed information in the database, the virtual storage application proceeds to aggregate the files and/or free space as a virtual storage device 620. Because the entries in the database are organized based on the file systems of the storage devices, the virtual storage application renders the virtual storage device such that the files, metadata, and/or free space which utilize the same or similar file system are aggregated together.

As noted above, the virtual storage device is rendered as a storage device to an additional device or computing machine coupled to the device. Additionally, the virtual storage device is rendered by the virtual storage application such that the files, metadata, capacity, and/or free space included in the storage devices coupled to the device are included in the virtual storage device. Further, the files, metadata, and/or free space in the virtual storage device can be linked with the entries included in the database and/or mapped back to corresponding files and/or free space included in the storage devices.

Once the virtual storage device is created and/or rendered, the virtual storage application will continue to manage the virtual storage application by scanning the ports of the device for one or more additional storage devices coupling to the device or one or more storage devices decoupling from the device. If any additional storage devices are detected to couple to the device, the virtual storage application will identify the file systems of the additional storage devices and update the database to include entries for the additional storage devices. In another embodiment, if any storage devices are detected to decouple from device, the virtual storage application will update the database to exclude the entries and information included in the entries of the decoupling storage devices. In response to any updates or changes made to the database, the virtual storage application will proceed to repopulate or re-render the virtual storage to include or exclude the changes made to the database.

In one embodiment, the virtual storage application will additionally monitor the virtual storage device for any read, write, and/or modifications made to files and/or free space included in the rendered virtual storage device. In response, the virtual storage application will map the corresponding instruction from the additional device or computing machine to one or more corresponding files on the storage devices for execution. Further, the virtual storage application will update the database to include any modifications to the files, metadata, and/or free space. The method is then complete or the virtual storage application can continue to manage the virtual storage device. In other embodiments, the method of FIG. 6 includes additional steps in addition to and/or in lieu of those depicted in FIG. 6.

Figure 7:
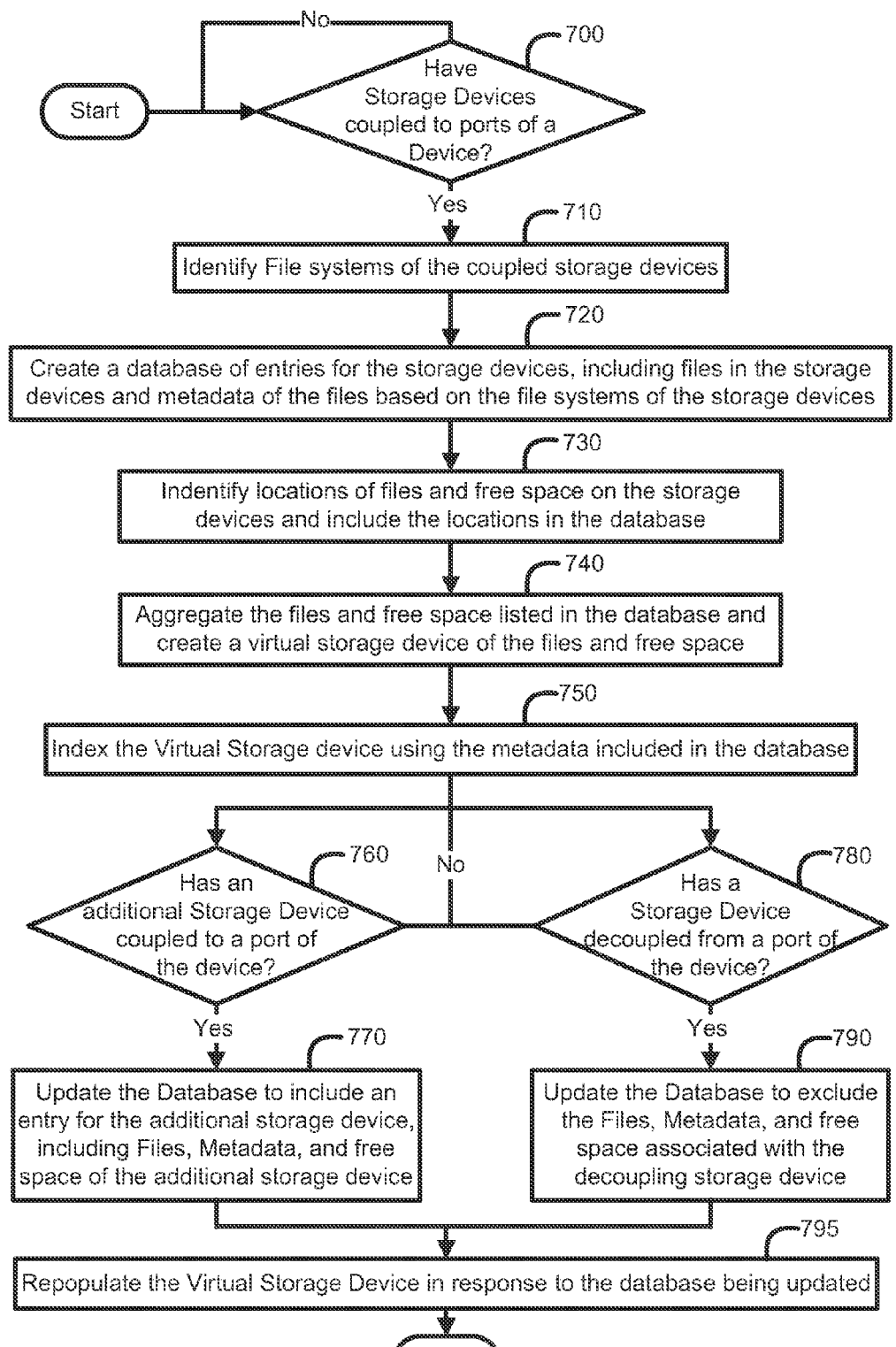
FIG. 7 is a flow chart illustrating a method for managing virtual storage device according to another embodiment of the invention.

FIG. 7 is a flow chart illustrating a method for managing a, virtual storage device according to another embodiment of the invention. Similar to the method of FIG. 6, the method of FIG. 7 uses a device with a controller, a communication channel, a storage component, one or more ports, and a virtual storage application. In other embodiments, the method of FIG. 7 uses additional components and/or devices in addition to and/or in lieu of those noted above and illustrated in FIGS. 1, 2, 3, 4, and 5.

As noted above, the virtual storage application will poll one or more ports of the device to determine whether any storage devices are coupled to the device 700. In one embodiment, the virtual storage application will scan one or more of the ports for any signals generated by the storage devices. If any signals are detected, the virtual storage application identify which port the signal is generated from and determine that one or more storage devices are coupled to the device. One or more of the ports can include a USB port, a serial device port, a compact flash port, an XD card port, a SD card port, a SATA port, an ESATA port, a PCI port, a PCIE port, and/or an IDE port. In other embodiments, one or more of the ports can include additional components configured to interface and engage a storage device when coupling the storage device to the device.

If no storage devices are detected, the virtual storage application will continue to scan for one or more storage devices coupled to the device 700. If one or more storage devices are detected, the virtual storage application will proceed to identify one or more file systems of the coupled storage devices 710. As noted above, one or more of the file systems can include a FAT, exFAT, NTFS, ETFS, ISO, DOS, ext, and/or a MFS file system. In other embodiments, additional file system types can be utilized by one or more of the coupled storage devices in addition to and/or in lieu of those noted above.

Additionally, a coupled storage device can utilize one or more files systems when encrypting, managing, and/or organizing files, metadata, and/or free space included in the coupled storage device. Further, a file system utilized in a first coupled storage device can be different from a file system utilized in a second coupled storage device. Once the virtual storage application has identified the file systems of the coupled storage devices, the virtual storage application proceeds to create a database of entries for the storage devices and populates the entries to include the files stored on the storage devices, metadata included in the storage devices, capacities of the storage devices, and/or free space included in the storage devices 720.

In one embodiment, the virtual storage application will additionally access information included in the metadata of the coupled storage devices to identify a location or address of the files and/or free space 730 on the corresponding storage devices. The location or address of the files and/or free space can then be included in the corresponding entries in the database. As noted above, the entries of the database are organized based on the file systems of the corresponding storage devices. In one embodiment, the virtual storage application will group together or organize entries of storage devices which use the same or similar file system next to one another.

The virtual storage application can then proceed to aggregate the files, metadata, capacity, and/or free space listed in the database to create a virtual storage device of the files, metadata, capacity, and/or free space of the storage devices coupled to the device 740. In one embodiment, the virtual storage application further indexes the virtual storage device using the location of the files and/or free space listed in the metadata to improve seek, access, and/or write times to the virtual storage device 750.

Once the virtual storage device has been created, the virtual storage application will render the virtual storage device as a storage device to one or more additional devices or computing machines coupled to the device. As noted above, the virtual storage device will list and/or include the files, metadata, capacity, and/or free space included in the storage devices coupled to the device. Additionally, the files, metadata, and/or free space will be linked to the database and/or mapped to the corresponding files, metadata, and/or free space on the coupled storage devices. In one embodiment, the virtual storage device will additionally be rendered to utilize one or more defined or predefined file systems.

Once the virtual storage device is created and/or rendered, the virtual storage application can continue to manage the virtual storage device by determining whether an additional storage device has coupled to a port of the device 760. If an additional storage device is detected to couple to the device, the virtual storage application will identify one or more file systems used in the additional storage device. Additionally, the virtual storage application will update the database to include a new entry for the additional storage device, including one or more file systems of the additional storage device, files stored on the additional storage device, metadata, a capacity of the additional storage device and/or an amount of free space of the additional storage device 770.

Further, the virtual storage application will repopulate and/or re-render the virtual storage device in response to the database being updated. As noted above, the virtual storage device is repopulated and/or re-rendered to include any additional files, metadata, capacity and/or free space 795 from the additional storage device. In another embodiment, the virtual storage application can additionally scan the ports of the device to determine whether any storage devices have decoupled from the device 780. If any devices are detected to be decoupled, the virtual storage application will proceed to update the database to exclude the corresponding entry of the decoupled storage device, including the files, metadata, capacity, and/or free space of the decoupled storage device 790.

Additionally, virtual storage application will repopulate and/or re-render the virtual storage device to exclude any files, metadata, capacity, and/or free space from the decoupled storage device 795. The method is then complete or the virtual storage application can continue to manage the virtual storage device in response storage devices coupling or decoupling from the device and/or in response to the virtual storage device being accessed or modified. In other embodiments, the method of FIG. 7 includes additional steps in addition to and/or in lieu of those depicted in FIG. 7.

What is claimed is:

1. A method for managing a virtual storage device comprising:
    scanning ports of a device for storage devices coupled to the device and identifying file systems of the storage devices;
    creating a database to include entries for the storage devices, where the entries include files in the storage devices and metadata of the files based on the file systems of the storage devices;
    ordering entries of the database which include different storage devices having a same file system next to one another; and
    aggregating the files listed in the database as the virtual storage device;
    indexing the virtual storage device using the metadata included in the database.

2. The method for managing a virtual storage device of claim 1 wherein the entries in the database are organized based on the file systems of the storage devices.

3. The method for managing a virtual storage device of claim 1 wherein the files included in the virtual storage device are linked to the entries included in the database.

4. The method for managing a virtual storage device of claim 1 further comprising populating the database with metadata from the storage devices.

5. The method for managing a virtual storage device of claim 4 wherein the metadata from the storage devices identify at least one from the group consisting of locations of the files on the storage devices, an amount of free space included in the storage devices, and a capacity of the storage devices.

6. The method for managing a virtual storage device of claim 4 further comprising indexing the virtual storage device using the metadata included in the database.

7. The method for managing a virtual storage device of claim 1 further comprising scanning the ports of the device for an additional storage device coupling to the device and identifying at least one file system used in the additional storage device.

8. The method for managing a virtual storage device of claim 7 further comprising updating the database to include files and metadata included in the additional storage device.

9. The method for managing a virtual storage device of claim 1 further comprising scanning the ports of the device for a storage device decoupling from the device and updating the database to exclude the files and the metadata included in the decoupling storage device.

10. The method for managing a virtual storage device of claim 1, further comprising defining a file system for the virtual storage device.

11. The method for managing a virtual storage device of claim 1, further comprising listing a capacity of the storage devices.

12. The method for managing a virtual storage device of claim 11, further comprising specifying a location of free space included in corresponding of the storage devices.

13. The method for managing a virtual storage device of claim 12, further comprising rendering the virtual storage device to appear and operate as another storage device which includes the files, the metadata, the capacity, and the free space included in the storage devices coupled to the device.

14. The method for managing a virtual storage device of claim 1, further comprising repopulating the virtual storage device by re-aggregating entries in the database in response to coupling and de-coupling of the storage devices.

15. A device comprising:
a controller;
ports configured to couple storage devices to the device; and
a virtual storage application executable by a processor from a non-transitory computer readable memory and configured to create a database to include entries for the storage devices, where the entries include files in the storage devices and metadata of the files based on the file systems of the storage devices;
wherein the virtual storage application aggregates the files listed in the database as a virtual storage device and indexes the virtual storage device using the metadata included in the database; and
wherein entries of the database which include different storage devices having a same file system are positioned next to one another.

16. The device of claim 15 wherein a first storage device coupled to the device includes a file system different from a second storage device coupled to the device.

17. The device of claim 15 wherein at least one of the storage devices coupled to the device includes a solid state device.

18. The device of claim 15 wherein the device is a direct attached storage device.

19. The device of claim 15 wherein the device is a network attached storage device.

20. The device of claim 15 wherein the ports of the device include at least one from the group consisting of a USB port, a serial device port, a compact flash port, a SD card port, an XD card port, an SATA port, an ESATA port, a PCI port, a PCIE port, and an IDE port.

21. A computer-readable program in a non-transitory computer-readable medium comprising:
a virtual storage application configured to scan ports of a device for storage devices coupled to the device;
wherein the virtual storage application is additionally configured to create a database to include entries for the storage devices, where the entries include files in the storage devices and metadata of the files based on the file systems of the storage devices;
wherein entries of the database which include different storage devices having a same file system are positioned next to one another;
wherein the virtual storage application is further configured aggregate the files listed in the database as a virtual storage device and index the virtual storage device using the metadata included in the database; and
wherein the virtual storage application updates the database to include an entry for an additional storage device detected to couple to a port of the device, including Files, Metadata, and free space of the additional storage device and the virtual storage application updates the database to exclude the Files, Metadata, and free space associated with a storage device detected to decouple from a port of the device.

22. The computer-readable program in a non-transitory computer-readable medium of claim 21 wherein the virtual storage application additionally updates the database in response to at least one from the group consisting of a storage device decoupling from the device and an additional storage device coupling to the device.

23. The computer-readable program in a non-transitory computer-readable medium of claim 21 wherein the virtual storage application further updates the database in response to at least one file on the virtual storage device being modified.

24. The computer-readable program in a non-transitory computer-readable medium of claim 21 wherein the virtual storage application additionally repopulates the virtual storage device in response to the database being updated.

25. The computer-readable program in a non-transitory computer-readable medium of claim 21 wherein the virtual storage application further renders the virtual storage device on another device coupled to the device as a predefined file system.

* * * * *

UNITED STATES PATENT AND TRADEMARK OFFICE
CERTIFICATE OF CORRECTION

| | | Page 1 of 1 |
|---|---|---|
| PATENT NO. | : 8,880,471 B2 | |
| APPLICATION NO. | : 12/815641 | |
| DATED | : November 4, 2014 | |
| INVENTOR(S) | : David H. Hanes | |

It is certified that error appears in the above-identified patent and that said Letters Patent is hereby corrected as shown below:

In The Drawings

In sheet 4 of 7, line 28 approx., delete "Files," and insert -- Files --, therefor.

In The Claims

In column 14, lines 6-7, in Claim 21, delete "configured aggregate" and insert -- configured to aggregate --, therefor.

Signed and Sealed this
Fourteenth Day of April, 2015

Michelle K. Lee
*Director of the United States Patent and Trademark Office*